(12) United States Patent  
Hoen (10) Patent No.: US 7,683,634 B2
(45) Date of Patent: Mar. 23, 2010

(54) MICROMACHINED CAPACITIVE SENSOR AND LINKAGE

(75) Inventor: Storrs T. Hoen, Brisbane, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 373 days.

(21) Appl. No.: 11/538,732

(22) Filed: Oct. 4, 2006

(65) Prior Publication Data

US 2008/0094075 A1   Apr. 24, 2008

(51) Int. Cl.
*G01R 27/26* (2006.01)

(52) U.S. Cl. .................. 324/661; 324/662; 324/686
(58) Field of Classification Search ............. 324/661, 324/662, 686
See application file for complete search history.

(56) References Cited

U.S. PATENT DOCUMENTS 6,664,786 B2 * 12/2003 Kretschmann et al. ...... 324/259

* cited by examiner

*Primary Examiner*—Amy He (57) ABSTRACT

In accordance with the invention, a surface capacitive sensor is mechanically coupled to a conventional macrostructure actuator to measure the displacement of the actuator along a measurement axis with high accuracy.

10 Claims, 11 Drawing Sheets

MICROMACHINED CAPACITIVE SENSOR AND LINKAGE

BACKGROUND OF THE INVENTION

There are two common types of capacitive sensors. In the first type of capacitive sensor, the measurement axis is normal to the surfaces of the sensing capacitor plates. The available motion in this type of capacitive sensor is therefore limited to the gap between the capacitor plates. In the second type of capacitive sensor, the measurement axis is parallel to the surfaces of the sensing capacitor plates. Typically, the second type of capacitive sensor has much larger available motion and is used, for example, in digital vernier calipers.

Micromachined capacitive sensors have been proposed that use facing surfaces of two micromachined parts to provide position sensing. These capacitive sensors typically offer excellent position sensitivity over a large bandwidth. The moving part (rotor) is suspended by micromachined flexures above the stationary part (stator) so there is typically little friction involved in the motion. Because the capacitive sensor is micromachined, the gap between the moving part and the stationary part can be reduced in size, typically to the order of 1 μm. The small gap size typically increases the sensitivity of the capacitive sensor. The travel of the micromachined capacitive sensor is typically on the order of about 100 μm because the travel is parallel to the surfaces of the capacitor plates.

Because micromachined capacitive sensors and other micromachined type sensors are typically very fragile they are typically used to detect only their own motion and are not coupled to an external actuator which is typically a macrostructure. Micromachined accelerometers and pressure sensors have been used to sense the acceleration and pressure, respectively, of conventional macrostructures from the beginning of micromachining because the moving part does not need to be directly coupled to a macroscale object.

SUMMARY OF INVENTION

In accordance with the invention, a surface capacitive sensor is mechanically coupled to a conventional macrostructure actuator to measure the displacement of the actuator along a measurement axis with high accuracy.

DETAILED DESCRIPTION

While the following embodiments in accordance with the invention use a surface capacitive sensor it is to be understood that other micromachined type sensors may be used as well such as capacitive comb finger sensors or magnetic sensors. Note that the positionable element in the following embodiments is typically not a micromachined structure but a macrostructure which is typically part of the external actuator. The macrostructure is typically formed by conventional machining techniques such as milling, forming or molding and typically has dimensions and features that have scales on the order of about millimeters to about tens of centimeters.

In the following discussion and accompanying figures, the z-direction refers to the normal of the stator surface of a surface capacitive sensor and the normal to the underlying silicon wafer or other suitable wafer material for a capacitive comb-finger sensor. The x-direction is the direction of preferred motion and is parallel to the stator surface for a surface capacitive sensor and is parallel to the direction of comb fingers for a capacitive comb-finger sensor. The y-direction is normal to both the x and z directions and lies in the plane of the stator for a surface capacitive sensor and lies perpendicular to the facing surfaces of the comb fingers for a capacitive comb-finger sensor.

A number of issues may typically arise when a micromachined position sensor is used to monitor the motion of a conventional macrostructure actuator. A micromachined position sensor typically has gaps between the rotor and stator on the order of 1 μm with a typical range of about 0.1 μm to about 20 μm. The micromachined position sensor needs to be coupled to the conventional macrostructure actuator so that the gap spacing is maintained. The gap spacing needs to be maintained during the attachment of the micromachined position sensor to the conventional positionable element, during the motion of the conventional macrostructure actuator and during any thermally induced variations of the relative positions of the micromachined position sensor and the conventional macrostructure actuator. The motion of the conventional macrostructure actuator should not damage the micromachined position sensor by causing the micromachined position sensor to have movements in undesired directions such as movements normal to the comb-fingers in a capacitive comb-finger sensor or a movement that results in rotation of a micromachined position sensor.

The term "linkage" as used herein is defined as the specially designed linkage discussed below. A specially designed linkage can be used to couple the motion between a micromachined position sensor and a positionable element that is typically mechanically coupled to the conventional macrostructure actuator. The linkage needs to accommodate undesirable movements of the positionable element while accurately transmitting the displacement of the positionable element along the measurement axis. An example of a conventional macrostructure actuator to be mechanically coupled to a micromachined capacitive sensor is a piezoelectric actuated linear stage, for example, one used in scanning probe microscopes, tuned lasers or tuned optical filters. A typical range of motion in the direction of desired motion is on the order of about 100 μm and may typically have a deviation in the range of about 1 nm to about 30 nm in the z-direction. It is critical that this deviation not be directly mechanically coupled to the micromachined capacitive sensor. The specially designed linkage needs to be compliant in the z-direction to ensure that while the positionable element moves in the z-direction, the gap (z-spacing) of the micromachined capacitive sensor is maintained. To accomplish this, the z-compliance of the specially designed linkage needs to be chosen to be significantly less than the z-compliance of the micromachined capacitive sensor.

Compliance of micromachined capacitive sensors is typically in the range from about 1 N/m to about 1000 N/m for the x-direction and typically in the range from about 100 N/m to about 100,000 N/m for the z-direction. For a z-direction motion of 30 nm at the positionable element to have less than a 1 nm z-direction motion at the micromachined capacitive sensor, the specially designed linkage needs to have a z-compliance of 300 N/m assuming a micromachined capacitive sensor z-compliance of 10,000 N/m. Taking as an example, a single sheet of hardened aluminum with a Young's modulus, E=160 GPa width, w=0.5 mm, thickness, t=25 μm and a length, L=3 mm gives for the compliance given by:

$$k_z = \frac{0.25 E w t^3}{L^3} \quad (1)$$

the value of 70 N/m. Hence, a 30 nm deviation of the positionable element in the z-direction results in a 0.24 nm deviation in the z-direction at the micromachined capacitive sensor. The compliance, $k_x$, given by:

$$k_x = \frac{E w t}{L} \quad (2)$$

in the x-direction is significantly stiffer with the value of 670,000 N/m. If the x-direction compliance of the micromachined capacitive sensor is 100 N/m, then the specially designed linkage is compressed 7 nm if the positionable element displaces 50 μm along the x-direction.

An important consideration is that the specially designed linkage not buckle during operation. The buckling load, $P_{crit}$, for the specially designed linkage above is given by:

$$P_{crit} = \frac{0.25 \pi^2 E w t^3}{12 L^3} \quad (3)$$

which gives a buckling load, $P_{crit}$=28 mN. The maximum applied force in the above example is 5 mN. Hence, the risk of buckling is comparatively small. Note that a thinning of the specially designed linkage to a thickness, t=6 μm would result in buckling. The considerations discussed above are understood to be incorporated in the exemplary embodiments that follow.

Figure 1:
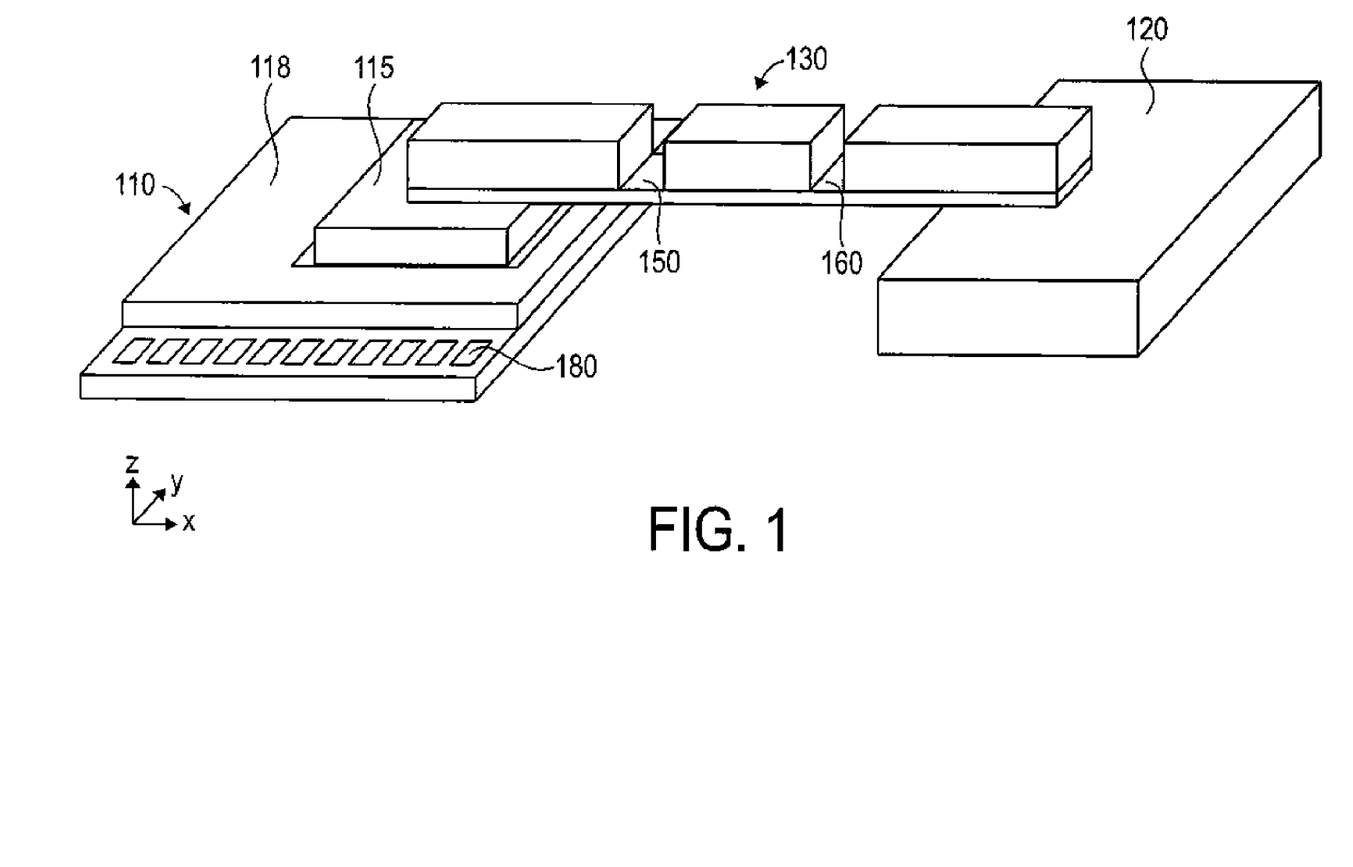
FIG. 1 shows an embodiment in accordance with the invention.

FIG. 1 shows an embodiment in accordance with the invention. Micromachined surface capacitive sensor 110 is mechanically coupled to positionable element 120 using linkage 130. Linkage 130 may an integral part of surface capacitive sensor 110 or a separate structure. Motion by positionable element 120 in the x-direction results in displacement of moveable element 115 of surface capacitive sensor 110. Displacement of moveable element 115 results in a change of the capacitance signal from surface capacitive sensor 110. Electrical pads 180 drive and sense surface capacitive sensor 110.

Typically, positionable element 120 is free to move both rotationally and translationally. However, to obtain proper function of micromachined surface capacitive sensor 110, the size of the vertical gap, typically on the order of about 1 μm, between moveable element 115 and stationary element 118 of surface capacitive sensor 110 needs to be maintained. To maintain the vertical gap it is typically necessary to decouple the undesired motions of positionable element 120 from surface capacitive sensor 110 using linkage 130. Hence, linkage 130 operates to both mechanically couple positionable element 120 to moveable element 115 and to decouple the undesired motions of positionable element 120 from moveable element 115. For example, positionable element 120 may have an undesired rotation about the y-axis and an undesired displacement in the z-direction. Using linkage 130 having thinned sections 150 and 160 in accordance with the invention as shown in FIG. 1 ensures that displacements of positionable element 120 along the z-direction are not directly mechanically coupled to moveable element 115. Similarly, rotations of positionable element 120 about the y-axis are not directly mechanically coupled to moveable element 115.

Figure 2:
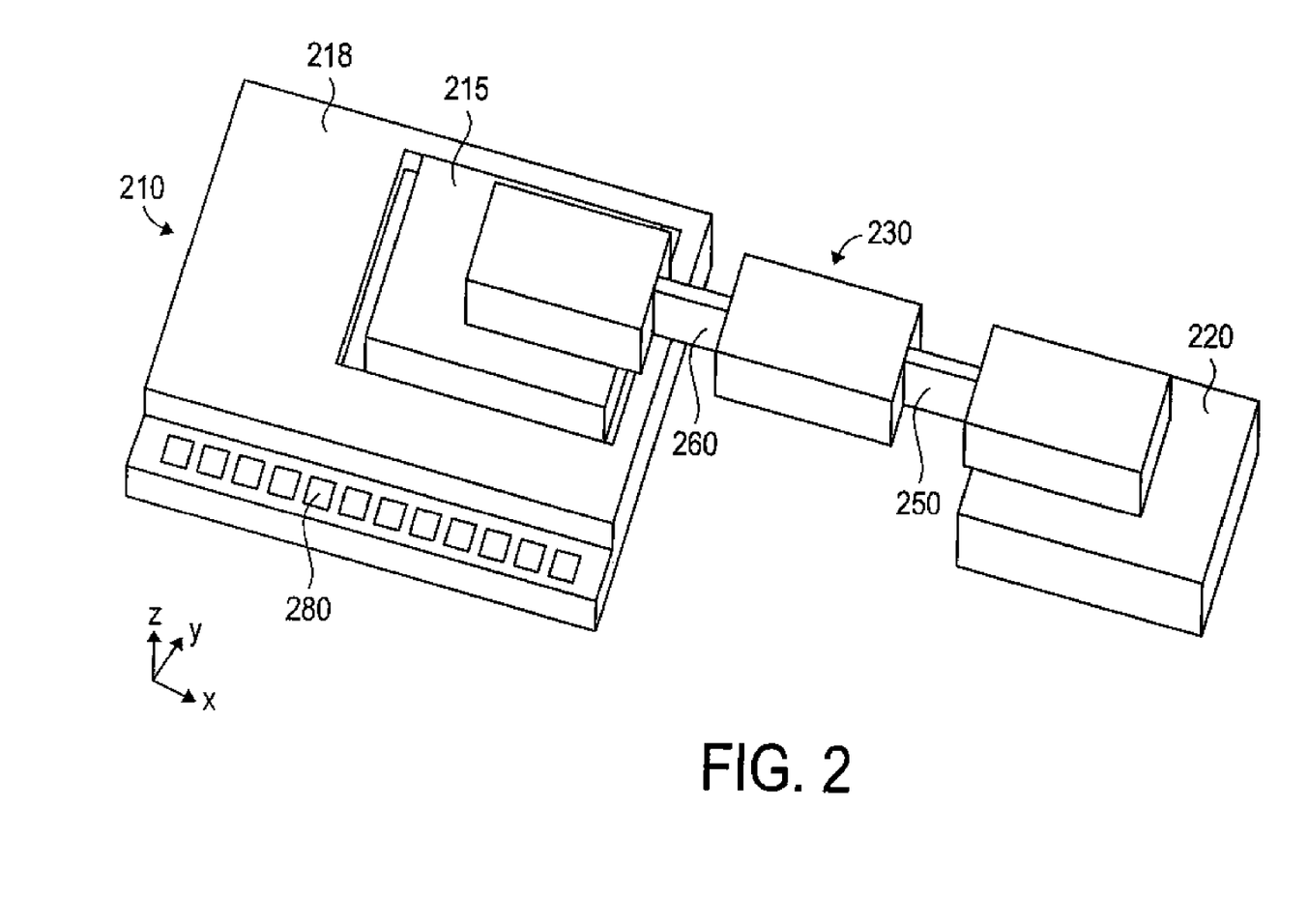
FIG. 2 shows an embodiment in accordance with the invention.

FIG. 2 shows an embodiment in accordance with the invention. Micromachined surface capacitive sensor 210 is mechanically coupled to positionable element 220 using linkage 230. Linkage 230 may an integral part of surface capacitive sensor 210 or a separate structure. Motion by positionable element 220 in the x-direction results in displacement of moveable element 215 of surface capacitive sensor 210. Displacement of moveable element 215 results in a change of the capacitance signal from surface capacitive sensor 210. Electrical pads 280 drive and sense surface capacitive sensor 210.

To obtain proper function of micromachined surface capacitive sensor 210, the size of the vertical gap, typically on the order of about 1 μm, between moveable element 215 and stationary element 218 of surface capacitive sensor 210 needs to be maintained. To maintain the vertical gap it is typically necessary to decouple the undesired motions of positionable element 220 from surface capacitive sensor 210 using linkage 230. Hence, linkage 230 operates to both mechanically couple positionable element 220 to moveable element 215 and to decouple the undesired motions of positionable element 220 from moveable element 215. For example, positionable element 220 may have an undesired rotation about the z-axis and an undesired displacement in the y-direction. Using linkage 230 having thinned sections 250 and 260 in accordance with the invention as shown in FIG. 2 ensures that displacements of positionable element 220 along the y-direction are not directly mechanically coupled to moveable element 215. Similarly, rotations of positionable element 220 about the z-axis are not directly mechanically coupled to moveable element 215.

Figure 3:
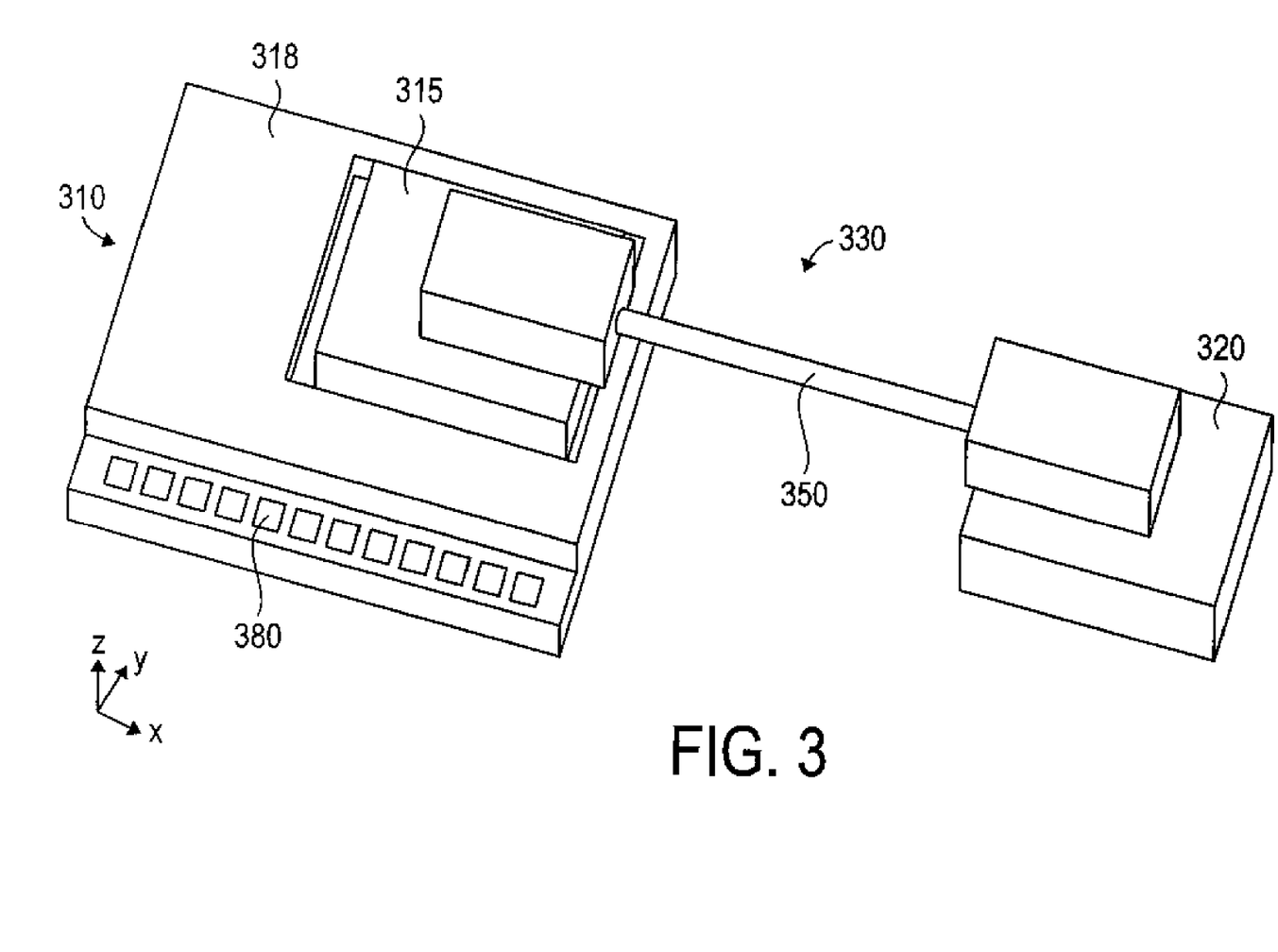
FIG. 3 shows an embodiment in accordance with the invention.

FIG. 3 shows an embodiment in accordance with the invention. Micromachined surface capacitive sensor 310 is mechanically coupled to positionable element 320 using linkage 330. Linkage 330 may an integral part of surface capacitive sensor 310 or a separate structure. Motion by positionable element 320 in the x-direction results in displacement of moveable element 315 of surface capacitive sensor 310. Displacement of moveable element 315 results in a change of the capacitance signal from surface capacitive sensor 310. Electrical pads 380 drive and sense surface capacitive sensor 310.

To obtain proper function of micromachined surface capacitive sensor 310, the size of the vertical gap, typically on the order of about 1 μm, between moveable element 315 and stationary element 318 of surface capacitive sensor 310 needs to be maintained. To maintain the vertical gap it is typically necessary to decouple the undesired motions of positionable element 320 from surface capacitive sensor 310 using linkage 330. Hence, linkage 330 operates to both mechanically couple positionable element 320 to moveable element 315 and to decouple the undesired motions of positionable element 320 from moveable element 315. For example, positionable element 320 may have undesired rotations about the x, y and z-axes and undesired displacements in the y and z-directions. In accordance with the invention, using linkage 330 having thin rod structure 350 as shown in FIG. 3 ensures that displacements of positionable element 220 along the y and z-directions are not directly mechanically coupled to moveable element 315. Similarly, rotations of positionable element 320 about the x, y and z-axes are not directly mechanically coupled to moveable element 315.

Figure 4:
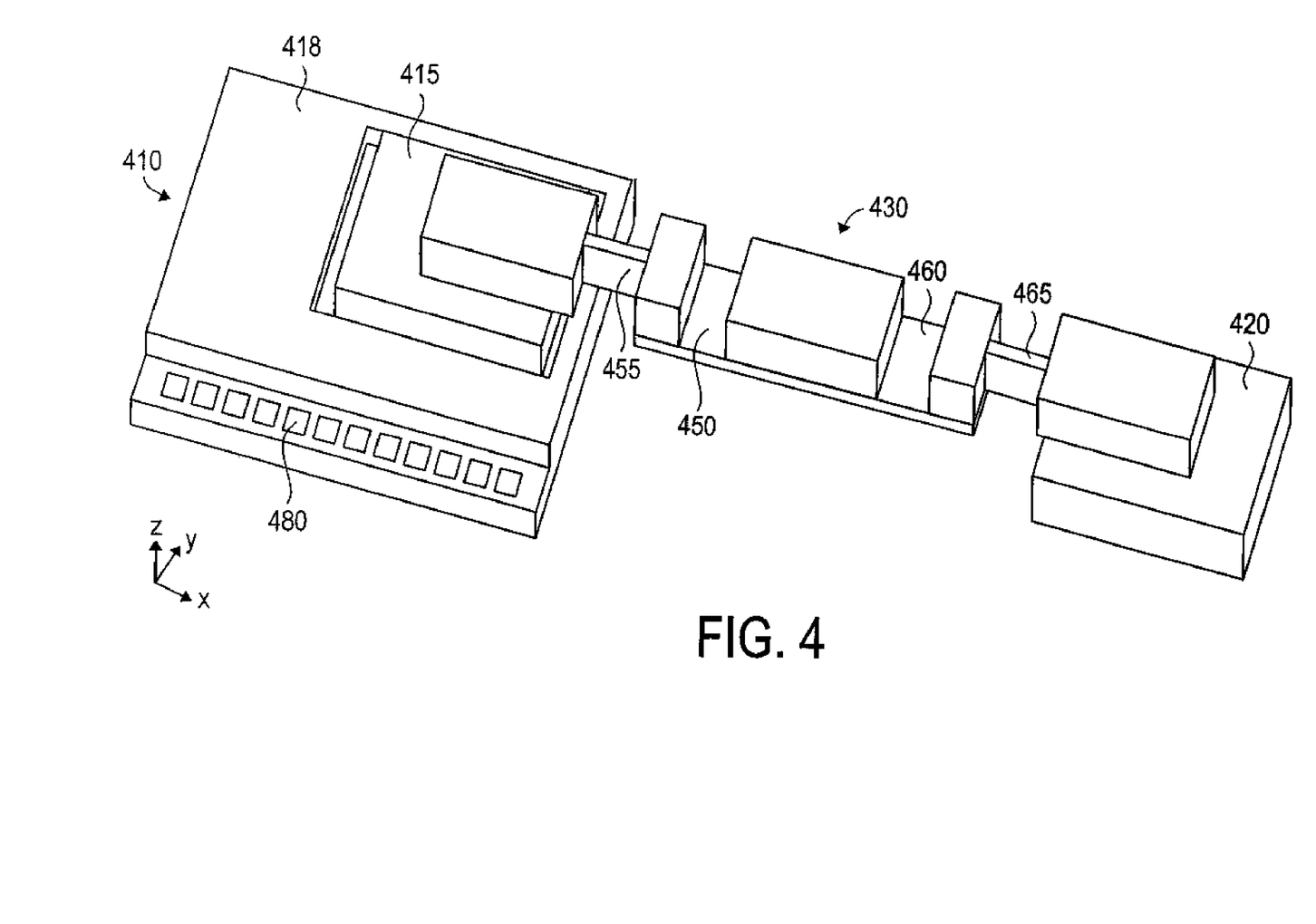
FIG. 4 shows an embodiment in accordance with the invention.

FIG. 4 shows an embodiment in accordance with the invention. Micromachined surface capacitive sensor 410 is mechanically coupled to positionable element 420 using linkage 430. Linkage 430 may an integral part of surface capacitive sensor 410 or a separate structure. Motion by positionable element 420 in the x-direction results in displacement of moveable element 415 of surface capacitive sensor 410. Displacement of moveable element 415 results in a change of the capacitance signal from surface capacitive sensor 410. Electrical pads 480 drive and sense surface capacitive sensor 410.

To obtain proper function of micromachined surface capacitive sensor 410, the size of the vertical gap, typically on the order of about 1 µm, between moveable element 415 and stationary element 418 of surface capacitive sensor 410 needs to be maintained. To maintain the vertical gap it is typically necessary to decouple the undesired motions of positionable element 420 from surface capacitive sensor 410 using linkage 430. Hence, linkage 430 operates to both mechanically couple positionable element 420 to moveable element 415 and to decouple the undesired motions of positionable element 420 from moveable element 415. For example, positionable element 420 may have an undesired rotation about the x, y and z-axes and undesired displacements in the y and z-directions. Using linkage 430 having thinned sections 450, 455, 465 and 460 in accordance with the invention as shown in FIG. 4 ensures that displacements of positionable element 420 along the y and z-direction are not directly mechanically coupled to moveable element 415. Similarly, rotations of positionable element 420 about the x, y and z-axes are not directly mechanically coupled to moveable element 415.

Figure 5:
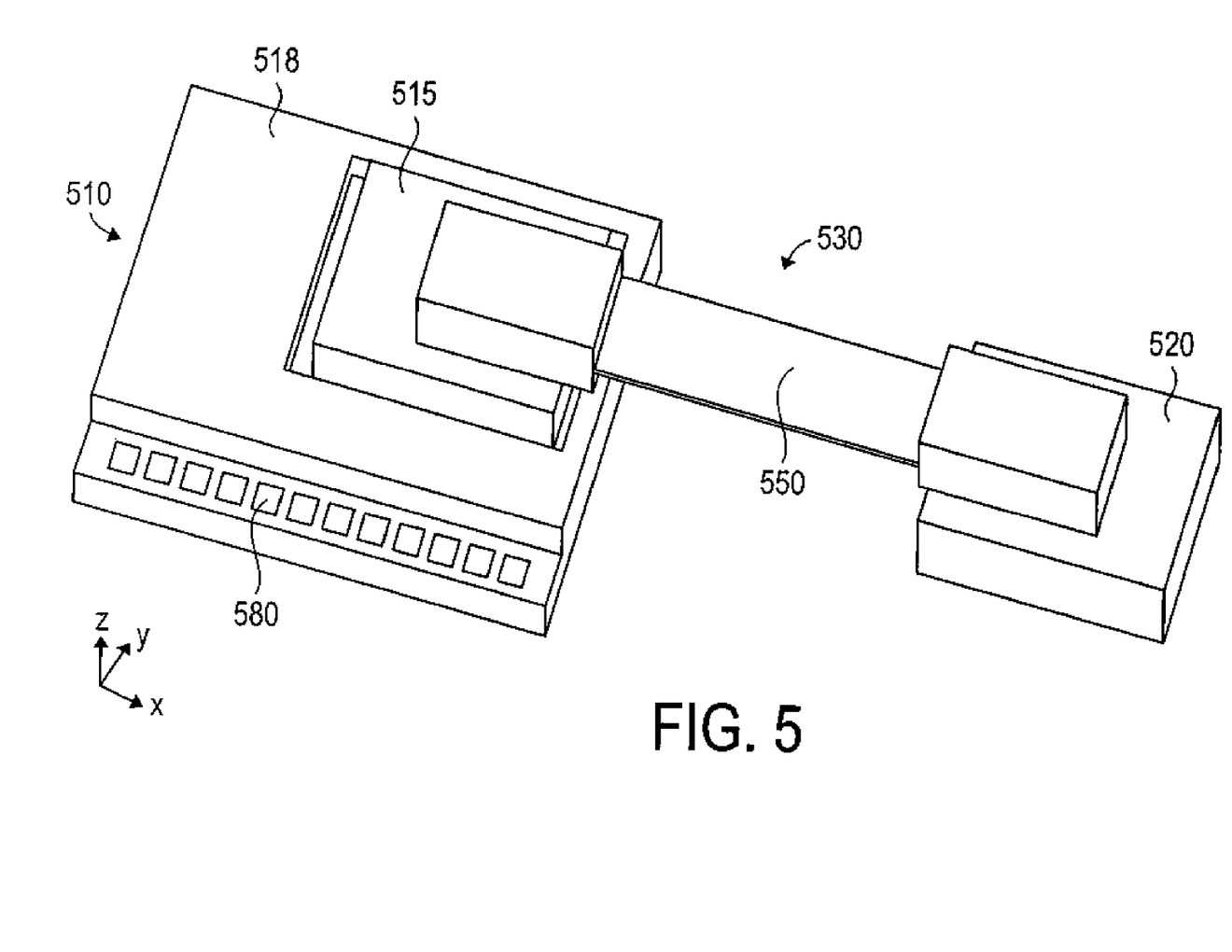
FIG. 5 shows an embodiment in accordance with the invention.

FIG. 5 shows an embodiment in accordance with the invention. Micromachined surface capacitive sensor 510 is mechanically coupled to positionable element 520 using linkage 530. Linkage 530 may an integral part of surface capacitive sensor 510 or a separate structure. Motion by positionable element 520 in the x-direction results in displacement of moveable element 515 of surface capacitive sensor 510. Displacement of moveable element 515 results in a change of the capacitance signal from surface capacitive sensor 510. Electrical pads 580 drive and sense surface capacitive sensor 510.

To obtain proper function of micromachined surface capacitive sensor 510, the size of the vertical gap, typically on the order of about 1 µm, between moveable element 515 and stationary element 518 of surface capacitive sensor 510 needs to be maintained. To maintain the vertical gap it is typically necessary to decouple the undesired motions of positionable element 520 from surface capacitive sensor 510 using linkage 530. Hence, linkage 530 operates to both mechanically couple positionable element 520 to moveable element 515 and to decouple the undesired motions of positionable element 520 from moveable element 515. For example, positionable element 520 may have undesired rotations about the x and y-axes and an undesired displacement in the z-direction. In accordance with the invention, using linkage 530 having thinned section 550 as shown in FIG. 5 ensures that displacements of positionable element 520 along the z-direction are not directly mechanically coupled to moveable element 515. Similarly, rotations of positionable element 520 about the x and y-axes are not directly mechanically coupled to moveable element 515.

Figure 6:
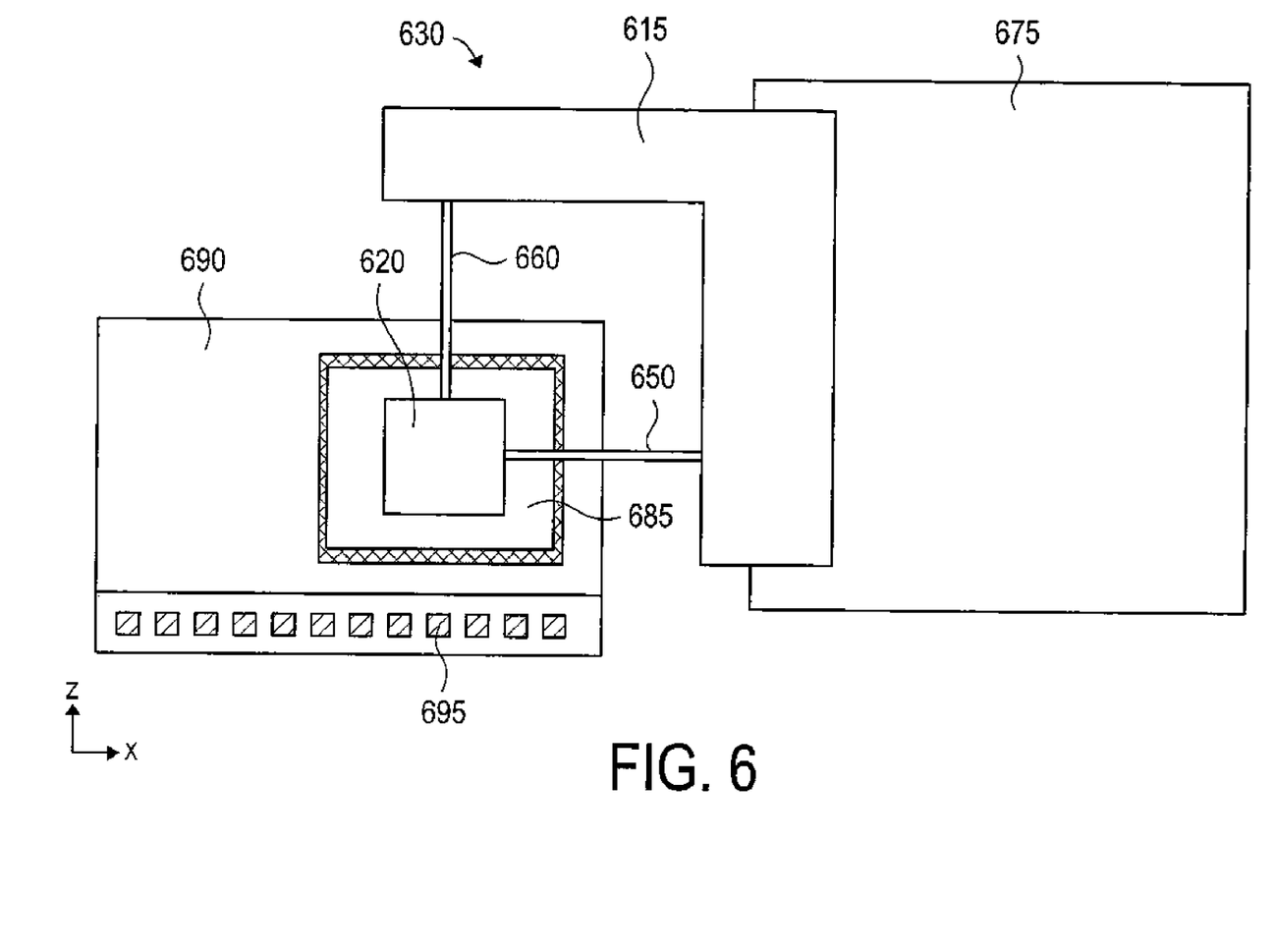
FIG. 6 shows an embodiment in accordance with the invention.

FIG. 6 shows an exemplary embodiment in accordance with the invention. Substructure 620 may an integral part of micromachined surface capacitive sensor 690 or a separate structure. Linkage 630 is mechanically coupled to positionable element 675 that moves in x and y directions. Positionable element 675 is mechanically coupled to linkage 630 using substructure 615 of linkage 630 while moveable element 685 is mechanically coupled to linkage 630 using substructure 620 of linkage 630. Linkage 630 functions to mechanically couple x-y linear motion from positionable element 675 to micromachined surface capacitive sensor 690. However, rods 660 and 650 of linkage 630 ensure that displacements of positionable element 675 in the z-direction are not directly mechanically coupled to moveable element 685. Similarly, rotations of positionable element 675 about the x, y and z-axes are not directly mechanically coupled to moveable element 685. Micromachined surface capacitive sensor 690 has electrical pads 695 to detect motion both in the x and y directions and has a flexure system that allows moveable element 685 to move in both the x and y directions.

Figure 7:
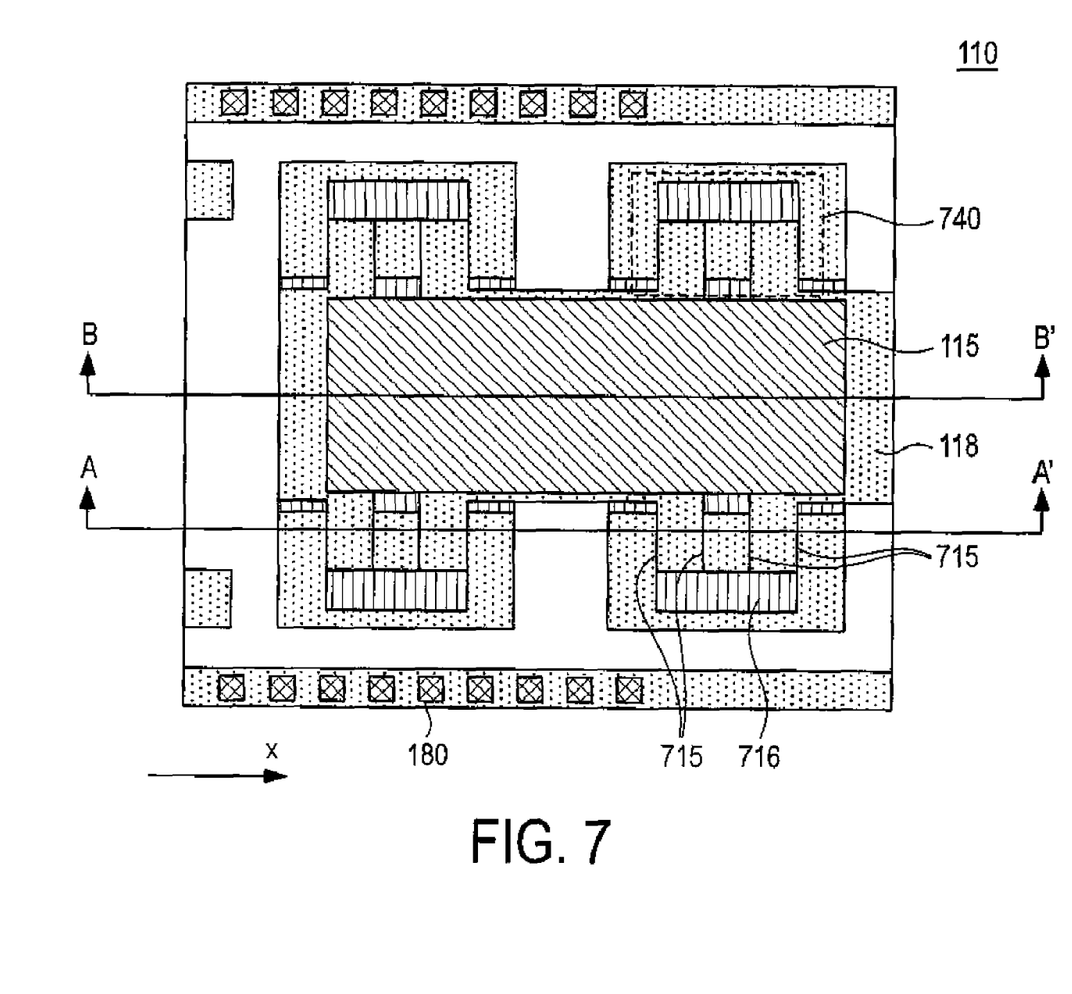
FIG. 7 shows a top view of a representative surface capacitive sensor in accordance with the invention with the linkage removed.

FIG. 7 shows a top view of representative surface capacitive sensor 110 in accordance with the invention with linkage 130 removed. Movable element 115 is attached to stationary element 118 using four flexures 740. Each flexure 740 includes four individual straight beams 715 connected to floating link 716. Two individual straight beams 715 of each flexure 740 connect to movable element 115 and remaining two individual straight beams 715 of each flexure 740 connect to stationary element 118. Four flexures 740 support movable element 115 above a portion of stationary element 118 and allow movable element 115 to be displaced in the x-direction.

Figure 8:
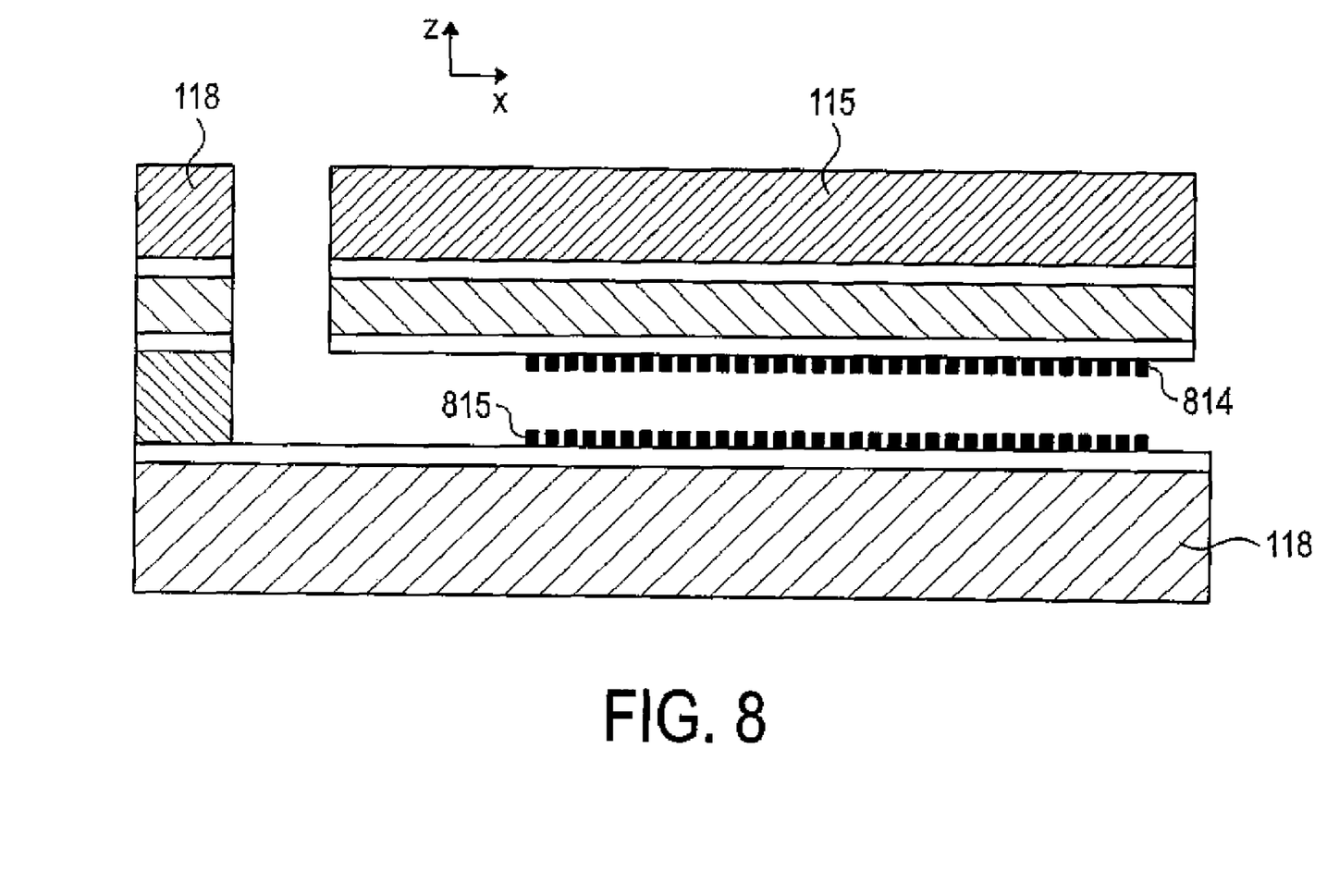
FIG. 8 shows a cross-sectional view of a representative surface capacitive sensor in accordance with the invention.

FIG. 8 shows a cross-sectional view of representative surface capacitive sensor 110 in accordance with the invention along line B-B' in FIG. 7. Movable element 115 is shown suspended over stationary element 118. Electrodes 814 are located on the lower surface of movable element 115 while electrodes 815 are located on stationary element 118 below electrodes 814.

Figure 9:
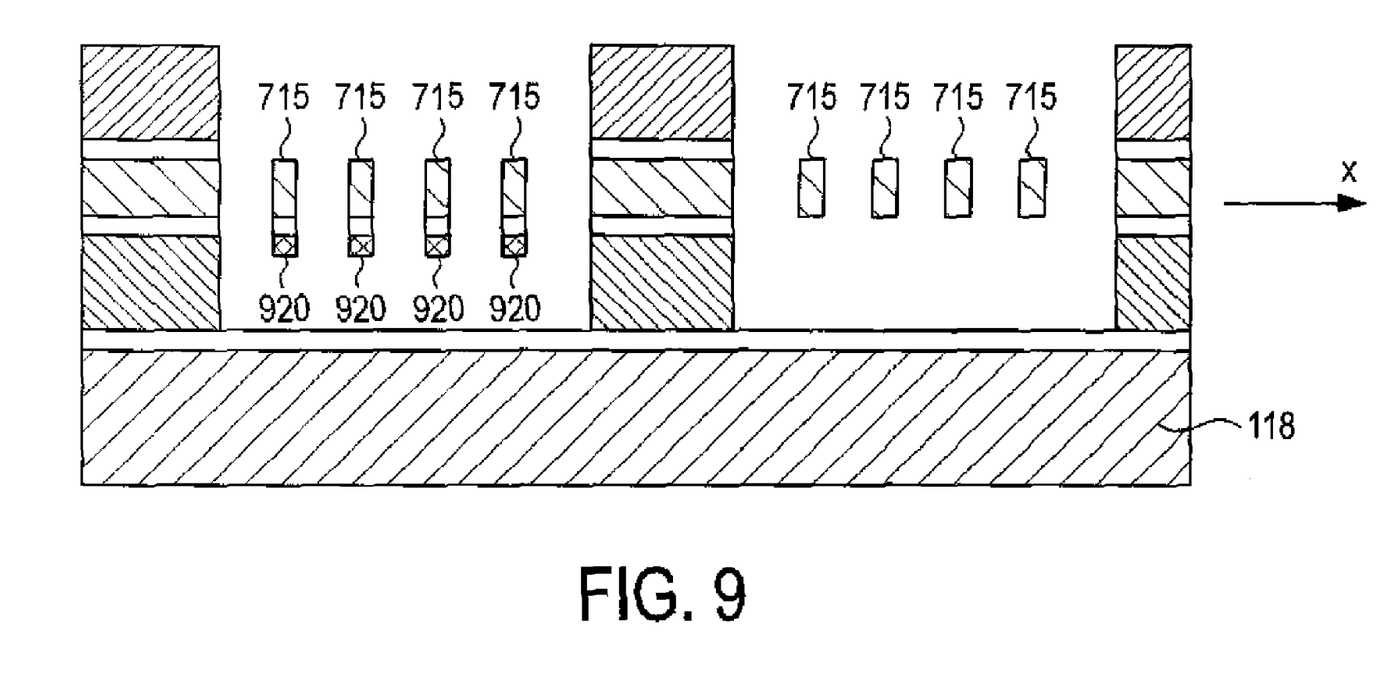
FIG. 9 shows a cross-sectional view of a representative surface capacitive sensor in accordance with the invention.

FIG. 9 shows a cross-sectional view of representative surface capacitive sensor 110 in accordance with the invention along line A-A' in FIG. 7. Straight beams 715 that support movable element 115 are shown. For at least one set of straight beams 715, metal lines 920 are deposited as shown to provide an electrical connection to electrodes 814 on the lower surface of movable element 115.

Figure 10:
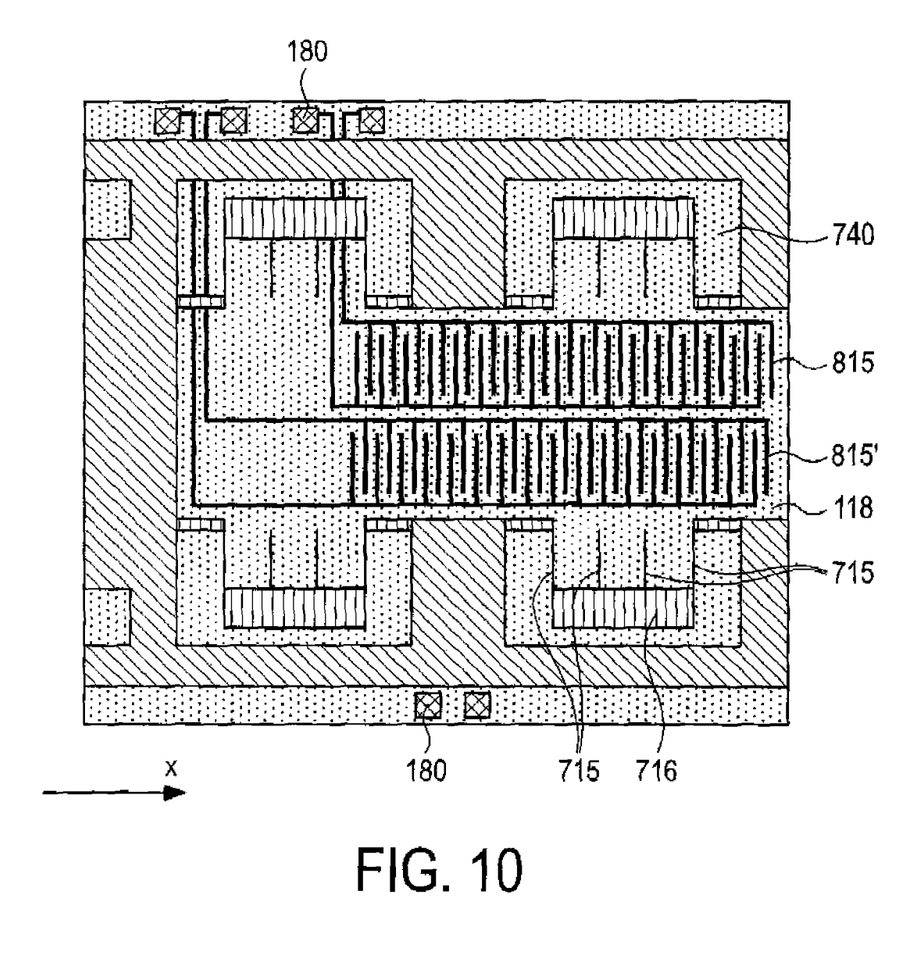
FIG. 10 shows a top view of a representative surface capacitive sensor in accordance with the invention with the movable element cutaway.

FIG. 10 shows a view of representative surface capacitive sensor in accordance with the invention with movable element 115 cutaway to show electrodes 815 and electrodes 815'. Electrodes 815 and 815' are shifted relative to each other by approximately half of the electrode pitch on stationary element 118.

Figure 11:
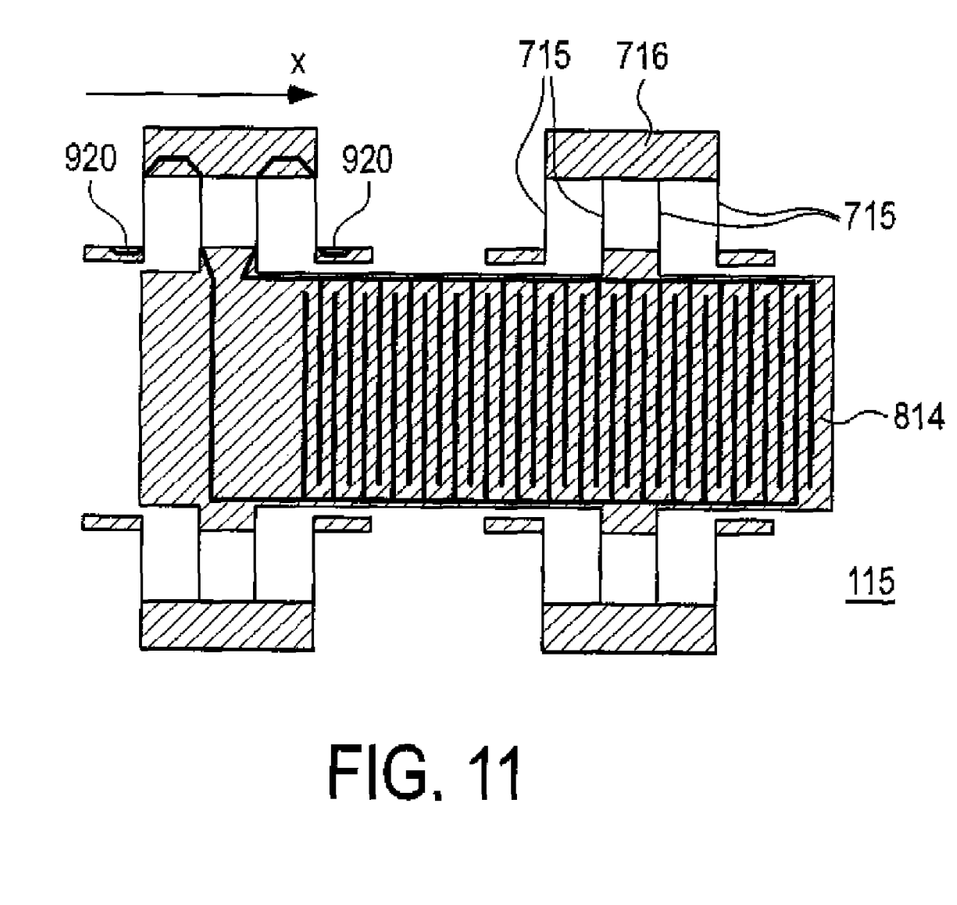
FIG. 11 shows the electrodes on the movable element in accordance with the invention.

FIG. 11 shows electrodes 814 on movable element 115 in accordance with the invention. By using electrodes 815 and 815', the position of movable element 115 can be determined for more than one electrode period. Further information regarding positional sensing may be found in "Integrated Position Sensing for Control of XY Actuator" by Hartwell et al. in Sensors, 2004, Proceedings of IEEE, 1407-1410 and Fasen and Hoen, U.S. Patent Publication No. 2003/0133372 which are incorporated herein by reference in their entirety.

Electrodes 815 and 815' allow the determination of both the lateral position and the gap spacing between movable element 115 and stationary element 118. Gap spacing is affected by the loading of the linkage, e.g. linkage 130, and the positionable element, e.g. positionable element 120. Changes in the gap spacing may affect the output of the surface capacitive sensor, e.g. surface capacitive sensor 110 and therefore it is important to use the detected gap spacing to generate the most accurate lateral position. For instance, if a pure sine wave is used to drive electrodes 814 on movable element 115, then a sinusoidal voltage will be induced on the stationary electrodes 815 and 815'. The amplitude of the induced sinusoidal voltage depends on both the lateral position of movable element 115 and the gap spacing. A smaller gap spacing will produce a larger induced voltage. The amplitudes of the output sine waves detected on stationary electrodes 815 and 815' uniquely determine the gap spacing between movable element 115 and stationary element 118. This unique gap spacing and the two output amplitudes will determine the position of movable element 115, modulus twice the pitch of stationary electrodes 815.

The invention claimed is:

1. An apparatus for determining a displacement of a positionable element along a measurement axis, the apparatus comprising:
    a micromachined surface capacitive sensor comprising a moveable element, the measurement axis, and a stationary element separated from said moveable element by a gap, a size of the gap being maintained as said moveable element moves along said measurement axis; and
    a linkage mechanically coupled to said moveable element and said positionable element, said linkage having the capability of accurately transmitting said displacement of said positionable element along said measurement axis to said moveable element, while accommodating motions of the positionable element that are not collinear with said displacement.

2. The apparatus of claim 1 wherein said positionable element is mechanically coupled to a macrostructure actuator.

3. The apparatus of claim 1 wherein said linkage comprises one or more sections thinned in a first direction perpendicular to said displacement.

4. The apparatus of claim 3 wherein said linkage comprises one or more sections thinned in a second direction perpendicular to said displacement and to said first direction.

5. The apparatus of claim 1 wherein said linkage comprises one or more thin rod structures comprising a principal axis that is collinear with said-displacement measurement axis.

6. The apparatus of claim 1 wherein said linkage comprises one section thinned in a first direction perpendicular to said displacement.

7. The apparatus of claim 1 wherein said linkage is an integral part of said micromachined surface capacitive sensor.

8. The apparatus of claim 1 wherein said micromachined surface capacitive sensor comprises a plurality of flexures.

9. The apparatus of claim 1 wherein said micromachined surface capacitive sensor further comprises a first set of electrodes and a second set of electrodes, each of the first and second sets of electrodes having an electrode pitch such that the first and second sets of electrodes are shifted in position relative to each other by approximately half of said electrode pitch.

10. An apparatus for determining a displacement of a positionable element along a measurement axis, the apparatus comprising:
    a micromachined surface capacitive sensor comprising a moveable element and a stationary element separated by a gap, the moveable element being configured to move along the measurement axis; and
    a linkage connected between the moveable element and the positionable element, the linkage being configured to couple motion of the positional element in a direction parallel to the measurement axis to the moveable element, and to decouple motion of the positional element in any direction not parallel to the measurement axis,
    wherein a size of the gap separating the movable element and the stationary element is maintained as the moveable element moves along the measurement axis, in response to the linkage decoupling the motion of the positional element in any direction not parallel to the measurement axis.

* * * * *